United States Patent
Joffray

(10) Patent No.: US 8,316,437 B2
(45) Date of Patent: Nov. 20, 2012

(54) METHOD FOR PROTECTING THE ACCESS TO AN ELECTRONIC OBJECT CONNECTED TO A COMPUTER

(75) Inventor: Olivier Joffray, Feucherolles (FR)

(73) Assignee: Gemalto SA, Meudon (FR)

( * ) Notice: Subject to any disclaimer, the term of this patent is extended or adjusted under 35 U.S.C. 154(b) by 223 days.

(21) Appl. No.: 12/744,275

(22) PCT Filed: Nov. 21, 2008

(86) PCT No.: PCT/EP2008/066040
§ 371 (c)(1),
(2), (4) Date: May 21, 2010

(87) PCT Pub. No.: WO2009/068489
PCT Pub. Date: Jun. 4, 2009

(65) Prior Publication Data
US 2010/0287610 A1    Nov. 11, 2010

(30) Foreign Application Priority Data
Nov. 27, 2007  (EP) .................................... 07301593

(51) Int. Cl.
*G06F 12/00* (2006.01)

(52) U.S. Cl. .................... 726/20; 726/2; 726/5; 726/26; 726/27; 713/184

(58) Field of Classification Search .................... 726/17, 726/19, 20, 27, 2, 5, 9, 16, 26; 713/184, 713/189, 193
See application file for complete search history.

(56) References Cited

U.S. PATENT DOCUMENTS

| 6,240,517 B1 * | 5/2001 | Nishioka ........................ 726/20 |
| 2003/0188195 A1 | 10/2003 | Abdo et al. |
| 2006/0101505 A1 | 5/2006 | Abdo et al. |
| 2006/0117106 A1 | 6/2006 | Abdo et al. |

FOREIGN PATENT DOCUMENTS

EP    1 351 467 A    10/2003

OTHER PUBLICATIONS

International Search Report (PCT/ISA/210) for PCT/EP2008/066040 dated Jan. 23, 2009, pp. 1- 4.
Written Opinion (PCT/ISA/237) for PCT/EP2008/066040 dated Jan. 23, 2009, pp. 1-7.
A. Nirmalananthan, "The Smart Card Cryptographic Service Provider Cookbook," Online, Oct. 2002, XP-002473873, pp. 1-24.

* cited by examiner

*Primary Examiner* — Kim Vu
*Assistant Examiner* — Baotran N To
(74) *Attorney, Agent, or Firm* — Buchanan Ingersoll & Rooney PC

(57) ABSTRACT

An electronic object carries out at least one operation on one element of an application installed in a computer. The method includes transmitting a random value of the electronic object to the computer, when such operation is completed, while maintaining in the electronic object the right of access to the electronic object by the user; storing the random value in the computer; giving access to the electronic object by the application and, in the case of a new access to the electronic object by the application; transmitting the random values stored in the computer to the electronic object; comparing, in the electronic object, the random value received from the computer with the random value previously transmitted to the computer; and, in case the random values are matching, re-establishing the previously acquired rights in the electronic object and thereby giving the application the access to the electronic object.

4 Claims, 1 Drawing Sheet

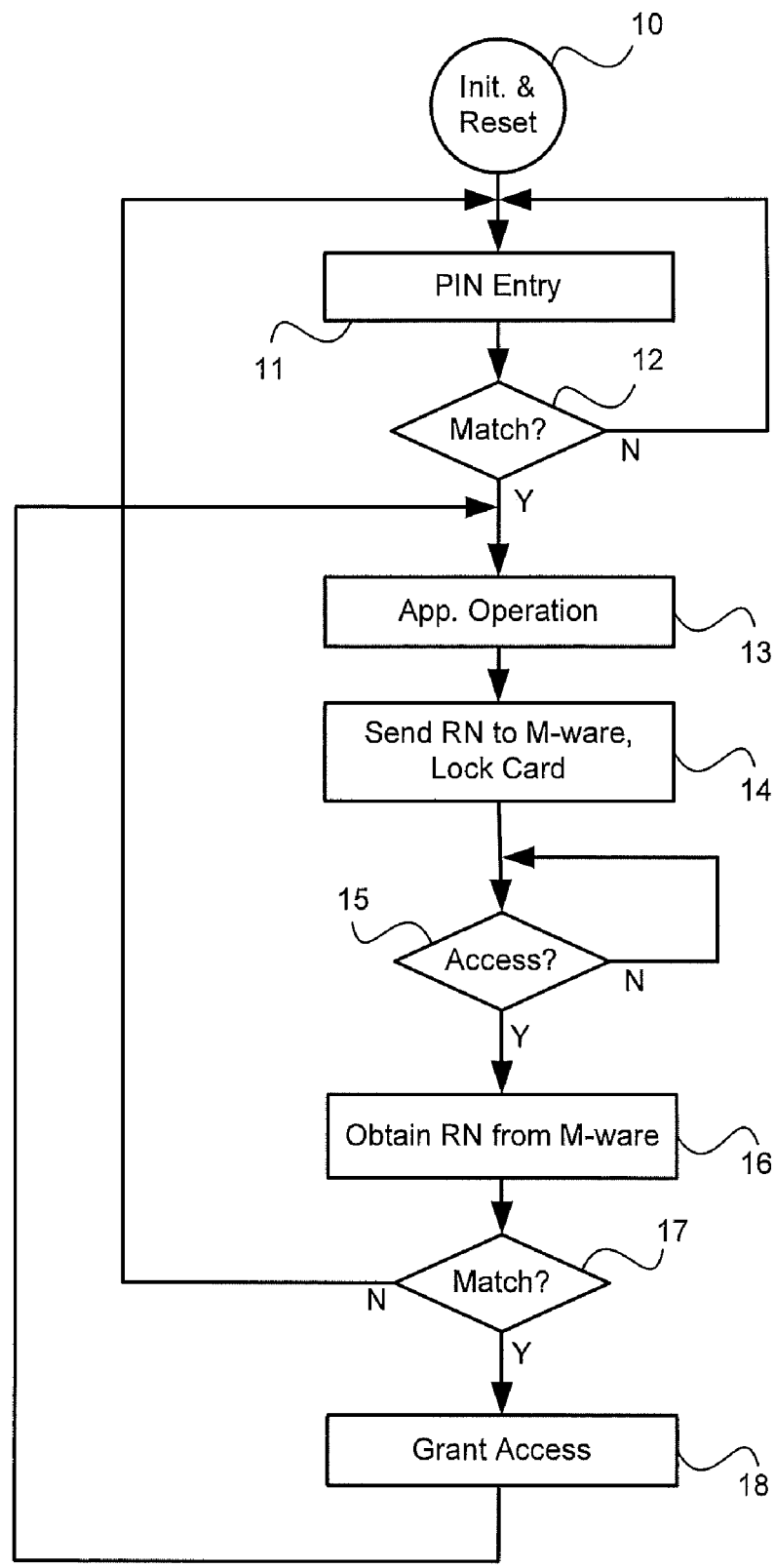

METHOD FOR PROTECTING THE ACCESS TO AN ELECTRONIC OBJECT CONNECTED TO A COMPUTER

The field of the invention is the protection of accesses to an electronic object connected to a computer.

As is known, such an electronic object is, for example, a USB connector or a chip card enabling the user/owner thereof to be authenticated with such computer or more precisely to have access to resources existing in the electronic object.

Using chip cards or USB connectors for protecting operations is more and more frequent. The chip card or the USB connector is inserted into the appropriate reader, connected to the computer or belonging to the computer. A program installed in the computer, for example a message handling system Outlook™, has access to the functionalities of the card or the connector through a program acting as an interface, typically a middleware.

A middleware is software used as a communication intermediary between several generally complex or distributed applications, in a computer network. The middleware provides high quality services related to the needs for communication of the applications (real time, protection, serialization, computerized transaction, etc).

This is also called an InterProcess Communication or IPC. It can be found in an OSI model above the transport layer (layers 5, 6 and 7).

The double interfacing mission of the middleware is as follows:
   the client or server process: the management of the application function calls or the management of the results forwarding.
   the editing of data with a view to the computerizing thereof by the transport layer.
Both missions are carried out by two distinct components:
   the Format And Protocol (FAP) edits the various data at the network level;
   the Application Programming Interface (API) deals with:
   the connections with and disconnections from the server;
   the definition of the connection environment (context variables, buffer zones); and
   the transfer of the requests and the reception of the results (n-bit group per n-bit group or globally).

Thus the middleware is located "under" the application, "above" the operating system and "between" two software units which need to communicate with each other.

A program installed in the computer thus communicates with the electronic object inserted in the computer through the middleware.

As regards safety, an electronic object such as a chip card or a USB connector enables, for example, the authentication of the user of the computer, the carrying out of the external authentications in a symmetrical or asymmetrical way or the establishment of protected communication channels.

Within the frame of the authentication of the user, it is assumed for example that the user wishes to plug in to a remote server, for example to a merchant service such as eBay™, to make transactions. Making transactions (purchasing or selling of products) requires, for safety reasons, a mutual authentication between the server of the site and the user. A mutual authentication means, on the one hand, that the user must be able to ascertain that he has accessed a server of the eBay™ site (to which he/she is going to transmit personal data such as a bank account number for example) and, on the other hand, that the server of the eBay™ site must be sure that the user who wishes to make transactions is the one who previously registered with this site and thus that he or she is not a fraud.

Authentication means the procedure which consists in checking the identity of an entity (a person, a computer . . . ) in order to give this entity access to resources (systems, networks, applications . . . ). Thus the authentication makes it possible to validate the authenticity of the entity concerned, and unlike the identification which makes it possible to know the identity of an entity, the authentication makes it possible to check the identity.

The authentication of a user by an electronic object which belongs to him or her, for example by a remote server, is preferred with respect to the authentication of the user by means of a password combined with a user's name, since the user may have his or her password and user's name stolen, in addition to losing his or her password and thus no longer being able to have access to the server. A malicious third party may then pretend he or she is the real owner of the user's name and password and make transactions in his or her name. This solution has the drawback of not being very well protected.

The electronic object is thus currently used for decrypting the received electronic mails, for encrypting electronic mails to be sent, for signing documents or electronic mails, or more generally for carrying out a cryptographic function on documents emitted by an application installed in the computer, for example Outlook™. In practice, on the present cards, the card just deciphers a short message which contains a symmetric key used for deciphering the message. Thus the message is deciphered/ciphered by the computer and not by the card. The card just deciphers the symmetric key protecting the transmitted message.

Conventionally, chip cards contain cryptographic calculation functions which must be executed before the access to a service included in the card can be authorized. These cryptographic calculation functions, for example, aim at checking the authenticity of a PIN code entered by the user or to establish a secure communication channel. They generally require a long processing time of the order of ten seconds. As an example, the establishment of a protected channel by Diffie-Hellmann, a signature calculation using long RSA connectors (1,536 or 2,048 bytes) can be cited.

Such operations are often cumulated when the level of the customised safety in the electronic object is high. For example, an RSA signature calculation may require checking the PIN code, establishing a protected channel, checking the cryptographic certificates for authentifying the RSA connectors, an external RSA authentication . . . . The execution of these successive operations results in an important extension of the execution time of a simple decryption of an electronic mail or the signature thereof.

In addition, when the safety check is completed in the electronic objet, for example the simple checking of a PIN code, the access to the advanced functionalities, for example the signature of a document or the decryption of a file, is authorized. This permission is valid until the user removes the electronic object from the computer. Typically, a user requests the access to protected functions when arriving at work and removes the electronic object when he or she leaves work. The access to a protected function is thus guaranteed for a long period of time.

This makes it possible for the user not to have to enter his or her PIN code upon each access to a protected function, for example upon the reception of each encrypted electronic mail.

The drawback of this situation is that the electronic objet remains inserted in the computer even when the application which must use this electronic object doesn't have access to the safety functionality of the electronic object. Thus, it may happen that a malicious program, typically a virus, accesses these security functionalities to carry out operations without the user's agreement.

A known solution to remedy this problem consists in storing the user's PIN code in the middleware of the computer used to have access to the content of the electronic object. This storage is typically masked. When the application installed in the computer no longer needs the functionalities of the electronic object, for example when an electronic mail has been decrypted, the associated middleware logically disconnects the electronic object from the computer to produce the same effect as would be obtained when removing the electronic object from the computer. This corresponds to a reset of the electronic object, this reset requiring entering the PIN code again. But as the PIN code has been stored by the middleware, the latter sends it back to the electronic object when the latter must be activated again. This, in fact avoids a new entry of the PIN code by the user.

However, this solution has two major drawbacks:
the storage of the user's PIN code in the computer is dangerous since a malicious program installed in the computer could detect it and transmit it to the electronic object. The drawback mentioned hereabove is not avoided in this case;
the forwarding of the PIN code to the electronic object triggers the same long user's authentication procedure as mentioned above and the functionalities of the electronic object are thus not available immediately.

The present invention aims at remedying these drawbacks.

More precisely, one of the objects of the invention is to provide a method for protecting the access to an electronic object inserted in a computer, such method not requiring the storage of the user's PIN code and allowing a subsequent almost immediate access to such resources, after an access to the resources of this electronic object by an application residing in the computer.

This object as well as other aims will appear in the following, and it is reached thanks to a method for protecting the access to an electronic object connected to a computer, the electronic object carrying at least one operation on one element of an application installed in a computer, the electronic object more particularly being used for authentifying a user of the electronic object by the computer and for granting access rights to the electronic object by at least one application installed in the computer, this method consisting in:
transmitting a random value of the electronic object to the computer, when the operation is completed, while maintaining in the electronic object the right of access to the electronic object by the user;
storing the random value in the computer;
giving access to such electronic object by the application and, in the case of a new access to the electronic object by the application:
transmitting the random value stored in the computer to the electronic object;
comparing, in the electronic object, the random value received from the computer with the random value previously transmitted to the computer and in case the random values are matching, re-establishing the previously acquired rights in the electronic object and thus giving the application the access to the electronic object.

Preferably, the granting of the rights of access to the electronic object by at least one application installed in the computer is given when the user has entered a correct PIN code in the electronic object.

The electronic object is advantageously a chip card.

The invention will be better understood when reading the following description of a preferred embodiment, given as an illustration and which is not limitative, and the single appended FIGURE which represents a diagram of the method according to the invention.

On the appended FIGURE, the step 10 is a step of initialization during which the user of a computer inserts an electronic object, for example a chip card into a computer. A reset of the card is carried out during this step.

During the step 11, the user is prompted to enter his or her PIN code to be authentified by the computer. The user then enters the PIN code on the computer keypad and the PIN code is transmitted to the card to be compared with the PIN code residing in the card.

During the step 12, the PIN code entered by the user is compared with the PIN code residing in the card. If they both match, the method goes to the step 13. If not so, the user is prompted again to enter his or her PIN code (step 11).

During the step 13, the card carries out an operation on one element of one application installed in the computer. This element is for example the file of an application, for example a .pst in Outlook™ or a .ppt in Powerpoint™. The rights of access to the card are thus granted to this application. The application has access to the card via the middleware installed in the computer. The operation executed by the card is for example one authentication of the remote Web server, a decryption of an electronic mail or then a signature of a document. When the operation is completed, the application no longer needs the card and is ready to give the access thereto.

Typically, in a Windows™ environment, the middleware having access to the card has an exclusive right access which means that no other application but the one currently communicating with the card can have access to the card functionalities. Microsoft™ drives thus provide a certain security level since malicious software will not have access to the current functionalities during the accesses to the card by the authorized software.

During the step 14, the card generates a random value, typically an 8-byte number. This random value is transmitted to the middleware which stores it. During this step, the card is locked, which means that it is not operational as regards the previously used application. On the contrary, the user's rights of access are maintained in the card and in particular a flag indicating that the previously entered PIN code (step 11) is correct. Therefore, the access to the card is given, and there is no longer any exclusive access thereto.

During the step 15, it is checked whether the middleware which is managing the card needs the card resources. If not so, the monitoring of a tentative access to the card is continued (loop execution of the step 15).

If a new access to the card is requested, for example because the user needs to decrypt another document, the method goes to the step 16 which consists in transmitting the random value stored in the middleware and thus in the computer, to the card. Then the card compares, during the step 17, the random value received from the computer with the random value previously transmitted to the computer, and in case the random values match (equality), it gives access to the card by the application (step 18). The previously acquired rights in the card are then re-established and the user may use his or her card again without having to re-enter his or her PIN code. Then, the method returns to the step 13 to carry out the operations requested by the user.

On the contrary, if the random values do not match, the user is prompted to enter his or her PIN code (step 11) as if he had just inserted the card into the computer.

The invention makes it possible to protect the access to an electronic object inserted in a computer without requiring the storage of the user's PIN code and allows a subsequent almost immediate access to the resources after an access to the resources of the electric object by an application residing in the computer.

The invention claimed is:

1. A method for protecting access to an electronic object connected to a computer, said electronic object carrying out at least one operation on one element of at least one application installed in said computer, said method comprising the steps of:
   authenticating, in said electronic object, a user of said electronic object;
   granting rights of access to said electronic object by an application installed in said computer upon authenticating the user;
   transmitting a random value of said electronic object to said computer, when an operation is completed, while maintaining in said electronic object the rights of access to said electronic object by said user;
   storing said random value in said computer;
   deactivating the rights of access to the electronic object by said application and,
   when said application newly accesses said electronic object, re-granting the rights of access by the steps of:
      transmitting said random value stored in said computer to said electronic object;
      comparing, in said electronic object, said random value received from said computer with the random value previously transmitted to said computer; and
      when said random values match, (i) re-establishing the previously acquired rights of access in said electronic object and (ii) giving said application the access to said electronic object.

2. A method according to claim 1, wherein said granting of the rights of access to said electronic object by at least one application installed in said computer is given when said user has entered a correct personal identification number into said electronic object.

3. A method according to claim 1, wherein said electronic object is a chip card.

4. A method according to claim 2, wherein said electronic object is a chip card.

* * * * *